United States Patent
Ouchi

(10) Patent No.: US 9,836,374 B2
(45) Date of Patent: Dec. 5, 2017

(54) SELF-DIAGNOSIS DEVICE AND SELF-DIAGNOSIS METHOD

(71) Applicant: Renesas Electronics Corporation, Kawasaki-shi (JP)

(72) Inventor: Masahide Ouchi, Kawasaki (JP)

(73) Assignee: RENESAS ELECTRONICS CORPORATION, Kawasaki-Shi, Kanagawa (JP)

(*) Notice: Subject to any disclaimer, the term of this patent is extended or adjusted under 35 U.S.C. 154(b) by 201 days.

(21) Appl. No.: 14/638,987

(22) Filed: Mar. 4, 2015

(65) Prior Publication Data
US 2015/0261637 A1    Sep. 17, 2015

(30) Foreign Application Priority Data

Mar. 17, 2014  (JP) .................................. 2014-052945

(51) Int. Cl.
G06F 11/00        (2006.01)
G06F 11/27        (2006.01)

(52) U.S. Cl.
CPC ................................. *G06F 11/27* (2013.01)

(58) Field of Classification Search
CPC .... G06F 11/2257; G06F 11/26; G06F 11/366; G01R 31/31724; G01R 31/3187
See application file for complete search history.

(56) References Cited

U.S. PATENT DOCUMENTS

| 2,986,198 | A | * | 5/1961 | Kolker | D06N 7/0028 264/246 |
| 4,500,951 | A | * | 2/1985 | Sugimoto | G05B 9/03 700/81 |
| 5,189,675 | A | * | 2/1993 | Nozuyama | G01B 31/31855 714/724 |
| 5,331,560 | A | * | 7/1994 | Tamura | F01N 11/007 123/479 |
| 5,696,676 | A | * | 12/1997 | Takaba | F02D 41/22 340/438 |
| 6,038,691 | A | * | 3/2000 | Nakao | G01R 31/31858 714/733 |
| 6,233,701 | B1 | * | 5/2001 | Onoue | G06F 11/263 714/33 |
| 6,708,301 | B1 | * | 3/2004 | Ohta | H01L 27/0207 714/724 |
| 6,728,907 | B1 | * | 4/2004 | Wang | G06F 11/073 714/2 |

(Continued)

FOREIGN PATENT DOCUMENTS

JP         2012-252373 A      12/2012

*Primary Examiner* — Loan L. T. Truong
(74) *Attorney, Agent, or Firm* — McGinn IP Law Group, LLC.

(57) ABSTRACT

A detailed execution schedule of self-diagnosis processing is set according to various requests.

A self-diagnosis device includes a plurality of functional blocks, a storage unit that stores a plurality of processing units, each of which is an aggregate of some functional blocks selected from the plurality of functional blocks, and a start condition of self-diagnosis processing of each processing unit, and a self-diagnosis unit that selects the processing unit where the self-diagnosis processing is started based on the start condition of each processing unit and executes the self-diagnosis processing of each functional block in the selected processing unit.

20 Claims, 11 Drawing Sheets

FIELD BIST CONTROL INFORMATION

| | Priority | Ex Time | Exec. Order |
|---|---|---|---|
| Chain_00 | 0 | 22 | 2, 3, 4, 6 |
| Chain_01 | 1 | 13 | 0, 1, 5 |
| Chain_02 | 3 | 9 | 5, 6 |
| Chain_03 | 5 | 17 | 1, 3, 5 |
| Chain_04 | 99 | 15 | 2, 4, 6 |
| Chain_05 | 5 | 35 | 0, 1, 2, 3, 4, 5, 6 |
| ⋮ | | | |
| Chain_nn | a | b | x, z, n |

(56) References Cited

U.S. PATENT DOCUMENTS

| | | | | |
|---|---|---|---|---|
| 7,260,744 B2 * | 8/2007 | Wu | G06F 11/2257 | 714/26 |
| 7,260,750 B2 * | 8/2007 | Wu | G06F 11/366 | 714/46 |
| 8,065,004 B2 * | 11/2011 | Zhou | A61N 1/3706 | 607/27 |
| 8,094,566 B2 * | 1/2012 | Hiraide | G01R 31/31907 | 370/241 |
| 9,529,047 B2 * | 12/2016 | Regner | G01R 31/3185 | |
| 2002/0019964 A1 * | 2/2002 | Zettler | G01R 31/31724 | 714/733 |
| 2002/0087237 A1 * | 7/2002 | Ol | G05B 19/0428 | 701/29.1 |
| 2003/0115509 A1 * | 6/2003 | Dubal | G06F 11/2247 | 714/46 |
| 2005/0095774 A1 * | 5/2005 | Ushiku | G05B 19/4184 | 438/222 |
| 2005/0188376 A1 * | 8/2005 | Matsumoto | G05B 23/0272 | 718/104 |
| 2005/0240802 A1 * | 10/2005 | Kakihara | G06F 11/0727 | 714/5.1 |
| 2009/0241124 A1 * | 9/2009 | Denneau | G06F 11/008 | 718/105 |
| 2010/0169714 A1 * | 7/2010 | Takahashi | G01R 31/31716 | 714/37 |
| 2010/0199284 A1 * | 8/2010 | Shimatani | G06F 11/26 | 718/103 |
| 2011/0196641 A1 * | 8/2011 | Sawai | G06F 11/24 | 702/117 |
| 2011/0313580 A1 * | 12/2011 | Bakhmach | G05B 9/03 | 700/292 |
| 2012/0072791 A1 * | 3/2012 | Kim | G06F 11/3656 | 714/718 |
| 2012/0226942 A1 * | 9/2012 | Gangasani | G06F 11/27 | 714/30 |
| 2012/0324294 A1 * | 12/2012 | Yamada | G06F 11/1004 | 714/42 |
| 2013/0019130 A1 * | 1/2013 | Hakhumyan | G11C 29/10 | 714/718 |
| 2013/0173970 A1 * | 7/2013 | Kleveland | G11C 29/44 | 714/710 |
| 2014/0002168 A1 * | 1/2014 | Yanagishima | H03K 17/723 | 327/296 |
| 2014/0122928 A1 * | 5/2014 | Wang | G06F 11/263 | 714/27 |
| 2015/0169382 A1 * | 6/2015 | Anderson | G06F 9/5094 | 718/104 |
| 2015/0241856 A1 * | 8/2015 | Walser | F24F 11/0009 | 700/275 |
| 2016/0041860 A1 * | 2/2016 | Mitsuishi | G06F 11/0721 | 714/48 |
| 2016/0062812 A1 * | 3/2016 | Takabatake | G06F 11/079 | 714/37 |
| 2016/0370799 A1 * | 12/2016 | Denton | G05B 23/0243 | |

* cited by examiner

FIG. 4

FIELD BIST CONTROL INFORMATION

|          | Priority | Ex Time | Exec. Order        |
|----------|----------|---------|--------------------|
| Chain_00 | 0        | 22      | 2, 3, 4, 6         |
| Chain_01 | 1        | 13      | 0, 1, 5            |
| Chain_02 | 3        | 9       | 5, 6               |
| Chain_03 | 5        | 17      | 1, 3, 5            |
| Chain_04 | 99       | 15      | 2, 4, 6            |
| Chain_05 | 5        | 35      | 0, 1, 2, 3, 4, 5, 6 |
| ⋮        |          |         |                    |
| Chain_nn | a        | b       | x, z, n            |

SELF-DIAGNOSIS DEVICE AND SELF-DIAGNOSIS METHOD

CROSS-REFERENCE TO RELATED APPLICATIONS

The disclosure of Japanese Patent Application No. 2014-052945 filed on Mar. 17, 2014 including the specification, drawings and abstract is incorporated herein by reference in its entirety.

BACKGROUND

The present invention relates to a self-diagnosis device and a self-diagnosis method, for example, relates to a self-diagnosis device and a self-diagnosis method which are built in a semiconductor device such as a microcomputer.

In general, regarding self-diagnosis processing of a microcomputer, an execution order of self-diagnosis of a plurality of functional blocks, which are targets of the self-diagnosis, is fixedly defined in advance. In recent years, the number of functional blocks increases due to miniaturization of a process, and accordingly, the execution time of self-diagnosis increases.

Here, Japanese Unexamined Patent Application Publication No. 2012-252373 discloses a technique related to a self-diagnosis device for efficiently executing self-diagnosis. The self-diagnosis device according to Japanese Unexamined Patent Application Publication No. 2012-252373 decides the execution order of self-diagnosis of each functional block based on an operating frequency during normal operation of each functional block and/or a priority setting value of each functional block when a self-diagnosis mode is started. Thereafter, the self-diagnosis device executes self-diagnosis processing of each functional block according to the execution order. When a time limit is exceeded or a threshold value of the number of self-diagnosis execution times is exceeded, the self-diagnosis processing of functional blocks of subsequent execution orders is not executed. Thereby, it is possible to preferentially execute self-diagnosis for functional blocks whose operating frequency is high.

RELATED ART DOCUMENT

Patent Document

Patent Document 1: Japanese Unexamined Patent Application Publication No. 2012-252373

SUMMARY

However, Japanese Unexamined Patent Application Publication No. 2012-252373 has a problem that it is not possible to set a detailed execution schedule according to various requests of the self-diagnosis processing. For example, functional blocks for which self-diagnosis is highly required and the execution order vary depending on whether the execution timing of the self-diagnosis is immediately after power-on, during normal operation, or immediately before interrupt processing. Even for the same functional block, the necessity of self-diagnosis varies depending on contents of a user program. In particular, for a functional block that operates in case of emergency, even if a usual operating frequency of the functional block is low, the necessity of self-diagnosis to be executed may be high.

The other purposes and new features will become clear from the description of the present specification and the accompanying drawings.

Means for Solving the Problems

According to an embodiment, a self-diagnosis device divides a plurality of functional blocks into a plurality of different processing units and individually sets a start condition of each processing unit.

A system obtained by replacing a device or a method of the aforementioned embodiment with a system, a program that causes a computer to perform processing of the device or some processing of the device, and an imaging device including the device, and the like are also effective as an aspect of the present invention.

Effect of the Invention

According to the aforementioned embodiment, it is possible to set a detailed execution schedule of self-diagnosis processing according to various requests.

BRIEF DESCRIPTION OF THE DRAWINGS

FIG. 4 is a diagram showing an example of Field-BIST control information according to the second embodiment.

DETAILED DESCRIPTION

Figure 1:
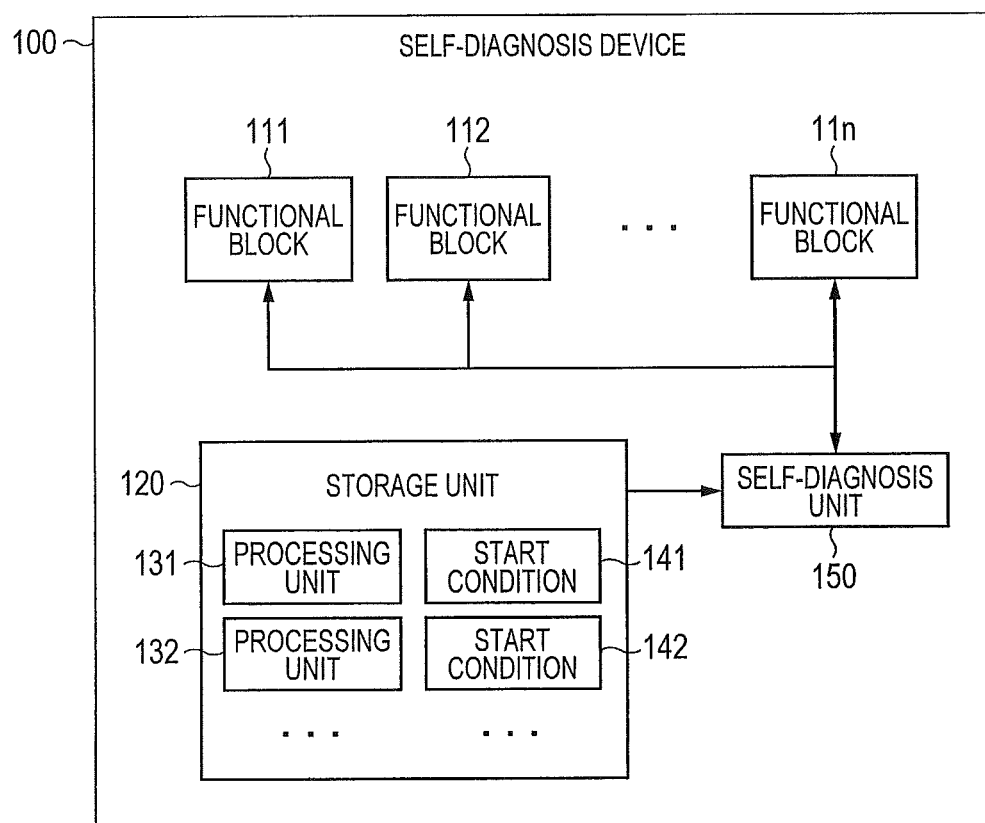
FIG. 1 is a block diagram showing a configuration of a self-diagnosis device according to a first embodiment.

In the description below, specific embodiments to which the means for solving the problems described above is applied will be described in detail with reference to the drawings. In the drawings, the same elements are denoted by the same reference numerals and redundant description will be omitted if necessary for clarification of the description.

The following embodiments will be explained, divided into plural sections or embodiments, if necessary for convenience. Except for the case where it shows clearly in particular, they are not mutually unrelated and one has relationships such as a modification, an application, detailed explanation, and supplementary explanation of some or entire of another. In the following embodiments, when referring to the number of elements, etc. (including the number, a numeric value, an amount, a range, etc.), they may be not restricted to the specific number but may be greater or smaller than the specific number, except for the case where they are clearly specified in particular and where they are clearly restricted to a specific number theoretically.

First Embodiment

A self-diagnosis device according to the first embodiment is, for example, a device that is built in a semiconductor device such as a microcomputer. Here, problems to be solved by the first embodiment will be described again.

In general, the self-diagnosis processing is executed during a period between immediately after power-on of the microcomputer to before execution of a user program is started, so that the self-diagnosis processing confirms a safety operation of the microcomputer system. Further, in general, target units (functional blocks) that are a plurality of self-diagnosis target portions in a microcomputer system are often coupled as one path that is hard-coded in advance by a daisy chain. Therefore, once execution of the self-diagnosis is started, the start of the user program is kept waiting until the diagnosis of all the self-diagnosis target units is completed. Here, the daisy chain is a coupling in which a plurality of target units are coupled in series by tying the target units in a row so that completion of operation of nth target unit becomes a cause of activation of operation of (n+1)th target unit. The hard-code is a state in which an execution order and a state transition condition are realized by a logic circuit based on a definition of the daisy chain.

Therefore, it is idealistic that the self-diagnosis is executed to confirm the safety of the system after power-on of the microcomputer and thereafter execution of the user program is started as soon as possible. However, there is a problem that the longer the one path coupled by the daisy chain as described above, that is, the greater the number of self-diagnosis target units, the longer the time is required.

Further, in recent years, general-purpose microcomputers are widely used, so that the same semiconductor device is increasingly used by various user programs. Therefore, there are various requests for self-diagnosis processing. As described above, it is not possible for only Japanese Unexamined Patent Application Publication No. 2012-252373 described above to set a detailed execution schedule. Therefore, the first embodiment described below solves such problems.

FIG. 1 is a block diagram showing a configuration of a self-diagnosis device 100 according to the first embodiment. The self-diagnosis device 100 includes functional blocks 111, 112, . . . , and 11n, a storage unit 120, and a self-diagnosis unit 150. The functional blocks 111 to 11n are an aggregate, that is, a functional module group, of circuits in a semiconductor device, and are target units which are self-diagnosis targets. The functional module group is, for example, a minimum configuration unit dividable by a restriction such as a clock domain and a power domain. The number of functional blocks may be three or more.

The storage unit 120 is a storage device that stores a plurality of processing units 131, 132, and so on and start conditions 141, 142, and so on of each processing unit. The processing unit 131 and the like are an aggregate of some functional blocks selected from the functional blocks 111 to 11n. In other words, a combination of functional blocks belonging to a processing unit is different from a combination of functional blocks belonging to another processing unit. For example, the functional blocks 111 and 112 belong to the processing unit 131 and the functional blocks 111 and 11n belong to the processing unit 132. There may be a processing unit to which all functional blocks belong and a processing unit to which only one functional block belongs. The start condition 141 and the like are timing when execution of self-diagnosis processing of each processing unit is started. The start condition 141 and the like may include an execution start condition of individual self-diagnosis processing of each functional block in a processing unit. For example, the start condition of self-diagnosis processing of the functional block 112 is after the self-diagnosis processing of the functional block 111. Therefore, it can be said that the start condition 141 and the like include an execution order of functional blocks in a processing unit.

The self-diagnosis unit 150 selects a processing unit whose self-diagnosis processing is to be started on the basis of the start conditions of the processing units. Then, the self-diagnosis unit 150 executes self-diagnosis processing of each functional block in the selected processing unit.

Figure 2:
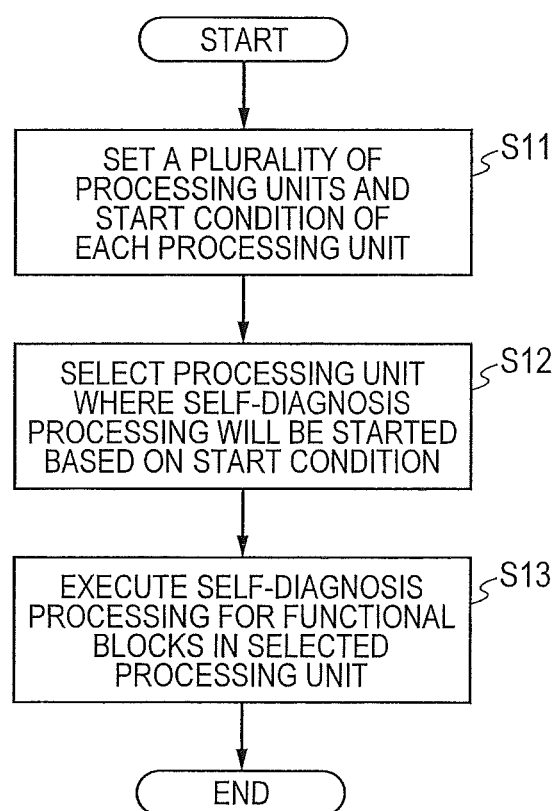
FIG. 2 is a flowchart showing a flow of self-diagnosis processing according to the first embodiment.

FIG. 2 is a flowchart showing a flow of the self-diagnosis processing according to the first embodiment. First, the self-diagnosis device 100 receives an input of a plurality of processing units described above and start condition of self-diagnosis processing of each processing unit and sets the processing units and the start conditions in the storage unit 120 (S11). In other words, the self-diagnosis device 100 receives an input of a definition of the processing units and the start conditions from outside and stores the definition of the processing units and the start conditions in the storage unit 120 as the processing unit 131 and the like and the start condition 141 and the like. For example, the processing units and the start conditions are inputted from a user.

Next, the self-diagnosis unit 150 selects a processing unit where the self-diagnosis processing is started based on the start condition of each processing unit (S12). Then, the self-diagnosis unit 150 executes the self-diagnosis processing for each functional block in the selected processing unit (S13).

In this way, in the first embodiment, a user of a microcomputer can set a plurality of functional blocks by dividing the functional blocks into appropriate processing units and individually set the start condition of self-diagnosis processing for each processing unit. In particular, when using a non-volatile storage device as the storage unit 120, it is possible to easily change the setting even after starting an operation.

For example, in a case of a general-purpose microcomputer, there are unused functional blocks depending on a user program. Therefore, it is not necessary to determine all the functional blocks to be self-diagnosis targets immediately after power-on. In such a case, it is possible to determine important functional blocks to be one processing unit, execute self-diagnosis of the processing unit immediately after power-on, determine the other functional blocks to be another processing unit, and execute self-diagnosis of the other processing unit at any timing after the user program is executed. Therefore, it is possible to optimize and minimize the time from immediately after power-on of the microcomputer to start of execution of the user program for each user system.

The execution time of the self-diagnosis processing varies for each functional block. Therefore, it is possible to make many and small processing units so that a functional block where the execution time of self-diagnosis processing is relatively long is included in a processing unit to which a small number of functional blocks belong and a functional block where the execution time of self-diagnosis processing is relatively short is included in a processing unit to which a somewhat large number of functional blocks belong. By appropriately setting the start conditions of these processing units, it is possible to set a detailed execution schedule of the self-diagnosis processing in accordance with various requests. In a sense, it can be said that it is possible to make an execution schedule of self-diagnosis processing having a high degree of freedom according to a user program.

Second Embodiment

Figure 3:
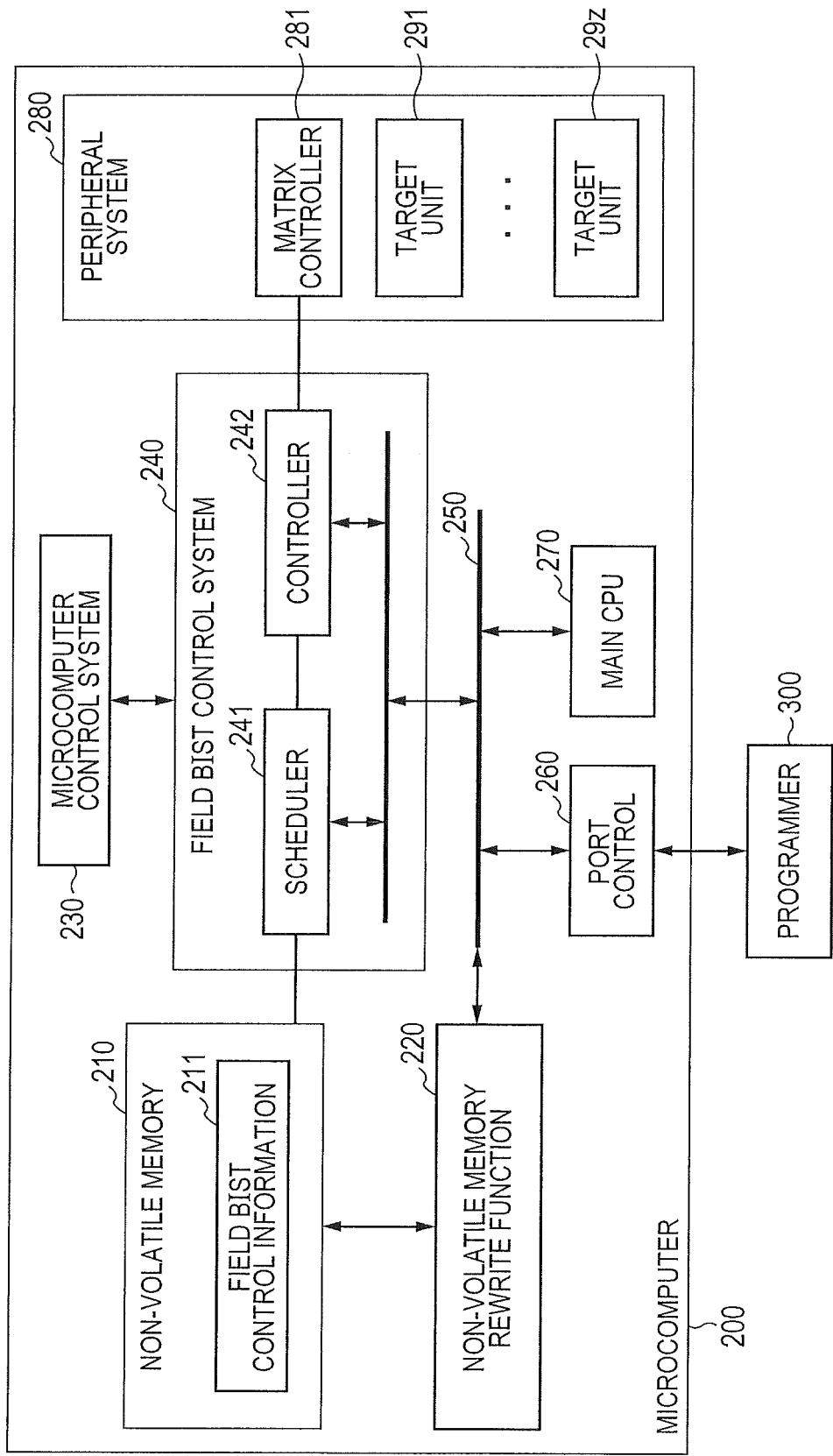
FIG. 3 is a block diagram showing a configuration of a microcomputer according to a second embodiment.

The second embodiment is an implementation example of the first embodiment described above. FIG. 3 is a block diagram showing a configuration of a microcomputer 200 according to the second embodiment. The microcomputer 200 includes a non-volatile memory 210, a non-volatile memory rewrite function 220, a microcomputer control system 230, a Field-BIST control system 240, an internal bus 250, a port control 260, a main CPU 270, and a peripheral system 280. The microcomputer 200 is externally coupled to a programmer 300 that is a setting device for rewriting the non-volatile memory 210.

The non-volatile memory 210 is an example of the storage unit 120 described above and stores field BIST control information 211. The field BIST control information 211 is an example of the processing unit 131 and the like and the start condition 141 and the like described above and is information related to the self-diagnosis target units and execution scheduling. The non-volatile memory rewrite function 220 has a function to rewrite contents of the non-volatile memory 210.

FIG. 4 is a diagram showing an example of the Field-BIST control information 211 according to the second embodiment. The Field-BIST control information 211 defines the processing units of self-diagnosis as a plurality of chains (Chains). Each chain is individually identified by an added number. Here, a chain name is illustrated by a form of "Chain xx" in which a two-digit number is added as a suffix. However, the identification information of the chain is not limited to this. For example, "Chain_00" is an example of a processing unit whose start condition is activation of the system and "Chain_01" is an example of a processing unit whose start condition is operation of the system. A chain includes a priority (Priority) between chains, an execution time (ExTime), and an execution order (Exec. Order) of target units in the chain as its components. Here, the priority between chains indicates that the self-diagnosis is executed in an order from a small number ("1") to a large number ("99"). Therefore, the priority between chains can be said to a periodical execution order between chains or an execution schedule of the chains. However, the "Chain_nn" of priority "a" is executed immediately before emergency interrupt processing or the like outside a normal execution schedule of chains. For the chains whose priority is the same, the self-diagnosis processing is executed in parallel. The priority between chains may be defined as a scheduled start time of self-diagnosis processing. The execution time of chain is, for example, an average value of past self-diagnosis processing time of the chain, that is, a rough estimate of the execution time of the chain. The execution order of target units in a chain are obtained by sequentially defining identification numbers of the target units in an order in which the self-diagnosis is executed. The execution order of target units in a chain may be defined so that a plurality of target units is executed in parallel.

The microcomputer control system 230 instructs the Field-BIST control system 240 to start the self-diagnosis processing when the system of microcomputer 200 is activated (after power-on and before the execution of the user program is started).

The Field-BIST control system 240 is coupled to the non-volatile memory 210, the microcomputer control system 230, the internal bus 250, and the peripheral system 280. The Field-BIST control system 240 reads the Field BIST control information 211 and decides the execution schedule of self-diagnosis. Then, the Field-BIST control system 240 issues an instruction of self-diagnosis of a target unit group based on the execution schedule to the peripheral system 280 according to a command from the microcomputer control system 230 or the main CPU 270. Then, the Field-BIST control system 240 acquires an execution result of the self-diagnosis from the peripheral system 280 and internally stores the execution result.

Figure 5:
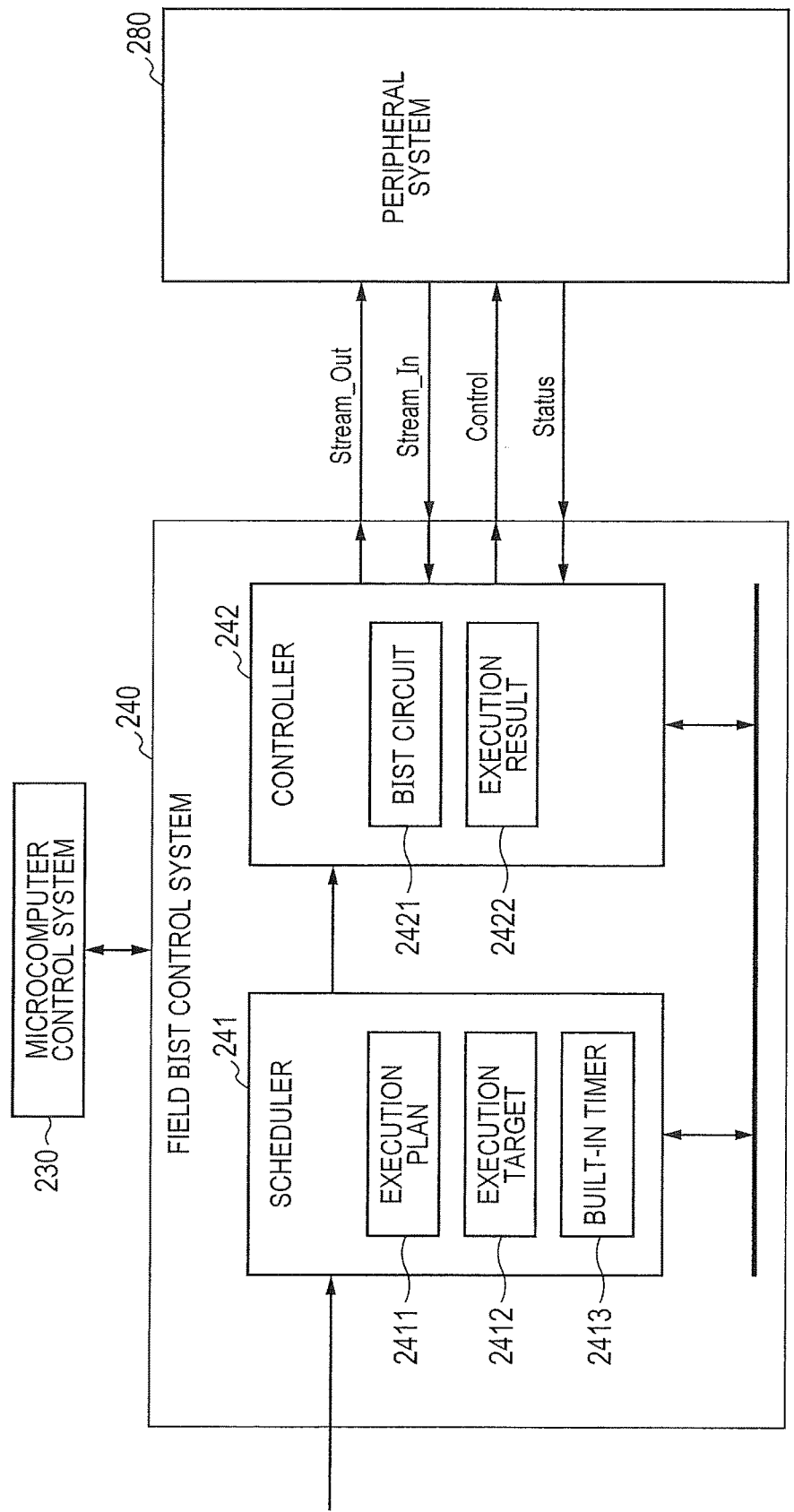
FIG. 5 is a block diagram showing a configuration of a Field-BIST control system according to the second embodiment.

FIG. 5 is a block diagram showing a configuration of the Field-BIST control system 240 according to the second embodiment. The Field-BIST control information 240 includes a scheduler 241 and a controller 242. The scheduler 241 is a functional module that reads the Field BIST control information 211 from the non-volatile memory 210 when the system is activated and determines an execution order and an execution condition of the self-diagnosis target units based on the Field BIST control information 211. The scheduler 241 includes an execution plan 2411, an execution target 2412, and a built-in timer 2413.

The execution plan 2411 is a functional module corresponding to a so-called queue with a priority. The execution plan 2411 spreads the chains in the Field-BIST control information 211 into the queue. Each chain in the queue includes the priority described above. Therefore, the scheduler 241 selects a chain having a high priority as a chain of self-diagnosis processing target by taking out the chain having a high priority from the queue and outputs the chain to the controller 242.

The execution target 2412 stores information corresponding to the execution order of target units belonging to each chain in the Field BIST control information 211. The built-in timer 2413 is used to determine a condition of start time of the execution schedule of the chain and measure the execution time of the chain and the target units.

The controller 242 selects a self-diagnosis target unit group of execution target based on the determined execution order and execution condition and indicates the self-diagnosis target unit group to the peripheral system 280. Further, the controller 242 acquires an execution result of the self-diagnosis from the peripheral system 280 and internally stores the execution result. The controller 242 includes a BIST circuit 2421 and an execution result 2422. The BIST circuit 2421 is a circuit for executing the self-diagnosis processing. Specifically, the BIST circuit 2421 receives the chain selected as a self-diagnosis processing target, the target units belonging to the chain, and the execution order from the scheduler 241. Then, the BIST circuit 2421 generates a test pattern based on the received chain and target units. Thereafter, the BIST circuit 2421 specifies the target units of self-diagnosis and the execution order of the target units to the peripheral system 280 and outputs the test pattern.

The port control 260 is a functional module to couple with a programmer 300 for rewriting a non-volatile memory. The main CPU 270 issues various processing commands in the microcomputer 200 according to execution of the user program and the like. In particular, the main CPU 270 issues a command to the Field-BIST control system 240 through the internal bus 250 in order to cause the Field-BIST control system 240 to change the scheduling of self-diagnosis and execute interrupt processing while the system is being operated (whiled the user program is being executed). Specifically, the main CPU 270 can change the priority of the chains in the queue of the execution plan 2411 through the internal bus 250. Thereby, although the self-diagnosis is executed with a fixed priority when the system is activated, the (execution) priority of the self-diagnosis while the system is being operated after the start of the execution of the user program can be changed freely according to an operating status of the system.

The peripheral system 280 is an aggregate of the target units (functional blocks) of the self-diagnosis. The peripheral system 280 includes a matrix controller 281 and target units 291 to 29z. The matrix controller 281 receives the target unit group of the self-diagnosis, the execution order, the test pattern, and the like from the Field-BIST control system 240, inputs the test pattern to a corresponding target unit group according to the execution order, and outputs an output result to the Field-BIST control system 240.

It can be said that the Field-BIST control system 240 and the matrix controller 281 according to the second embodiment are an example of the self-diagnosis unit 150 described above.

As an example of the setting of the Field BIST control information 211, the microcomputer 200 receives a setting instruction of the processing units, the start conditions, and the like from the programmer 300 through the port control 260, and sets the Field BIST control information 211 in the non-volatile memory 210 by the non-volatile memory rewrite function 220.

As another setting example of the Field BIST control information 211, the main CPU 270 instructs the scheduler 241 and the controller 242 to change the chains when the system is operated. Further, the main CPU 270 can directly overwrite the Field BIST control information 211.

Here, one of features of the second embodiment can be represented as follows. The start condition of a processing unit includes the execution order (Exec. Order) of the self-diagnosis processing of the functional blocks in each processing unit and the priority (Priority) between the processing units. The self-diagnosis unit (for example, the Field-BIST control system 240) selects a processing unit where the self-diagnosis processing is started on the basis of the priority and executes the self-diagnosis processing of the functional blocks in the selected processing unit on the basis of the execution order. In this way, it is possible to perform detailed control by performing hierarchical control such as between chains, within a chain, and a flag described later as execution control of the functional blocks.

Specifically, a user can properly select and set the self-diagnosis target so that the self-diagnosis target is "Chain_00" when the system is activated and the self-diagnosis target is "Chain_01" and the following Chains when the system is operated. Therefore, it is possible to set an optimal diagnosis target unit according to functional safety requirements for the system of the user by the Field BIST control information 211. For example, when the system is activated, only target units necessary to safely activate the system are registered as a chain and the self-diagnosis is executed. Thereafter, when the system is operated, the self-diagnosis target units are divided and registered as a plurality of chains and executed. Thereby, it is possible to appropriately select and execute a chain which is an execution target according to an operating status of the system, so that it is possible to satisfy the functional safety requirements of a customer in the system.

In particular, for example, a self-diagnosis target unit which is highly frequently used by a user program when the system is operated is registered in a possible shortest chain to increase the independence of the self-diagnosis target unit. It is possible to provide a more reliable system operation by appropriately use the above mechanism and execute self-diagnosis of each chain based on appropriate timing and system operating condition.

From the above, the summary of the effects of the second embodiment is as follows. In a user system which a user of a microcomputer wants to implement, it is possible to appropriately and easily set the self-diagnosis target units at system activation necessary to safely activate a customer system, so that the self-diagnosis during system activation can be completed in an optimal period of time for the system. As a result, the user program becomes executable in an optimal period of time after power-on of the microcomputer. On the other hand, regarding the diagnosis of portions that are important to safely operate the system, by using a mechanism that can set the self-diagnosis target units, it is possible to execute the self-diagnosis of the portions at appropriate timing after the system is activated.

Further, a user of a microcomputer can easily reduce and increase the self-diagnosis target units according to functional safety requirements of a customer for a user system even in another user system using the same microcomputer (another customer system whose application is different), so that it can be expected to complete the self-diagnosis at system activation in an optimal execution time by setting optimal self-diagnosis target units.

Third Embodiment

The third embodiment enables change of a schedule while the self-diagnosis processing is being executed. While the self-diagnosis processing is being executed, the content of the self-diagnosis processing needs to be able to be changed due to other processing other than the self-diagnosis processing, such as occurrence of interrupt processing of a microcomputer and increase or decrease of load of the entire system. Therefore, the third embodiment will be described below.

Figure 6:
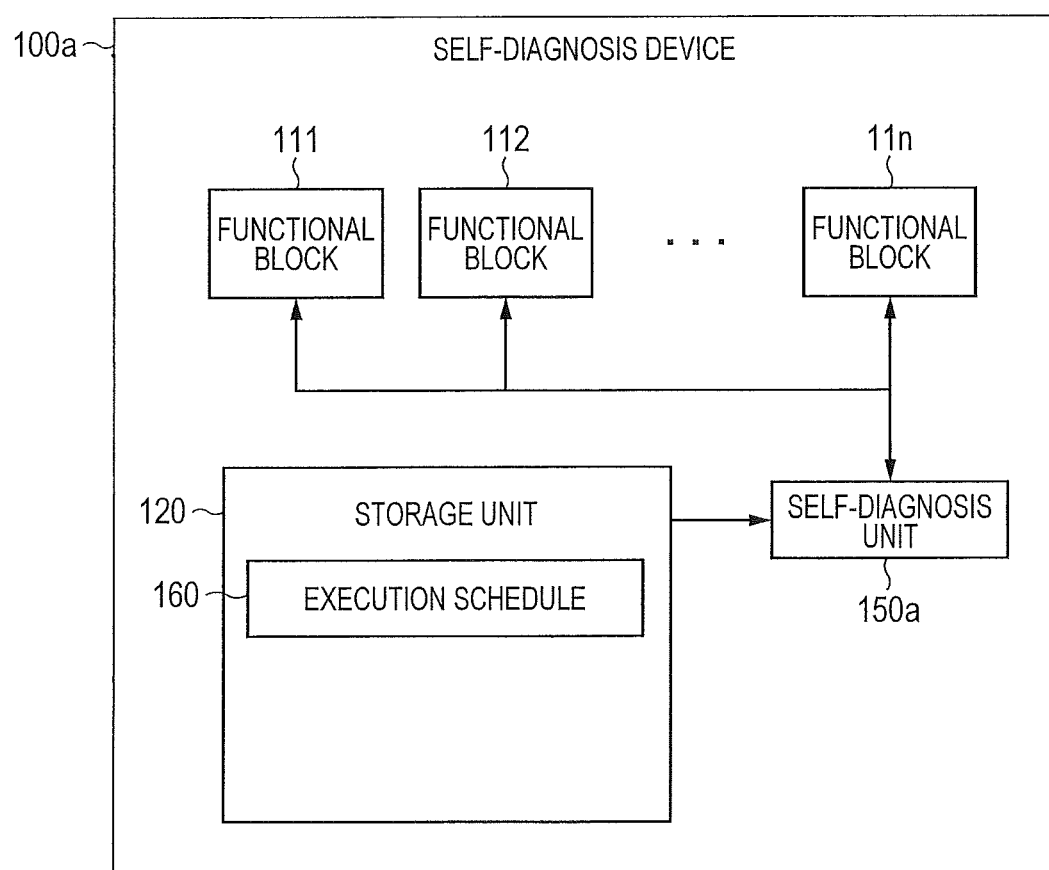
FIG. 6 is a block diagram showing a configuration of a self-diagnosis device according to a third embodiment.

FIG. 6 is a block diagram showing a configuration of a self-diagnosis device 100a according to the third embodiment. The self-diagnosis device 100a includes functional blocks 111, 112, . . . , and 11n, a storage unit 120, and a self-diagnosis unit 150a. The functional block 111 and the like are the same as those in the first embodiment. The storage unit 120 stores an execution schedule. The execution schedule 160 is not limited to the processing unit 131 and the like and the start condition 141 and the like in FIG. 1, but may be information indicating at least a schedule for executing the self-diagnosis processing of a plurality of functional blocks.

The self-diagnosis unit 150a executes the self-diagnosis processing of the plurality of functional blocks ill to 11n based on the execution schedule 160. While the self-diagnosis processing is being executed, the self-diagnosis unit 150a changes the functional block where the self-diagnosis processing is to be executed in the execution schedule 160 according to an execution status of other processing other than the self-diagnosis processing. Thereby, the flexibility of the self-diagnosis processing improves, so that it is possible to respond to various requests.

Here, even when the system is being operated, the self-diagnosis processing can be executed if other processing such as the user program does not execute the functional blocks of self-diagnosis processing targets. Conversely, if the user program and the self-diagnosis processing use the same functional block, a problem occurs in a processing result, so that only either one can be used. Normally, the user program and the like are executed more preferentially than the self-diagnosis processing. Therefore, when the self-diagnosis processing is executed according to the execution schedule 160 and the functional block where the self-diagnosis processing is to be executed next is executed for a long time by the user program or the like that is executed in parallel, the self-diagnosis processing of the functional block where the self-diagnosis processing is to be executed is kept waiting. In particular, when the functional block is operating at substantially all times due to execution content of the user program or the like, the self-diagnosis processing substantially stops and the execution schedule cannot be completed.

Therefore, it is preferable that the third embodiment can perform as described below. The self-diagnosis unit 150a according to the third embodiment executes the self-diagnosis processing in parallel with other processing. When the functional block where the self-diagnosis processing is to be executed based on the execution schedule is being executed by other processing, the self-diagnosis unit 150a starts the self-diagnosis processing of another unexecuted functional block instead of the functional block. Thereby, at least the execution schedule can be continued and the self-diagnosis processing can be completed except for some functional blocks.

Figure 7:
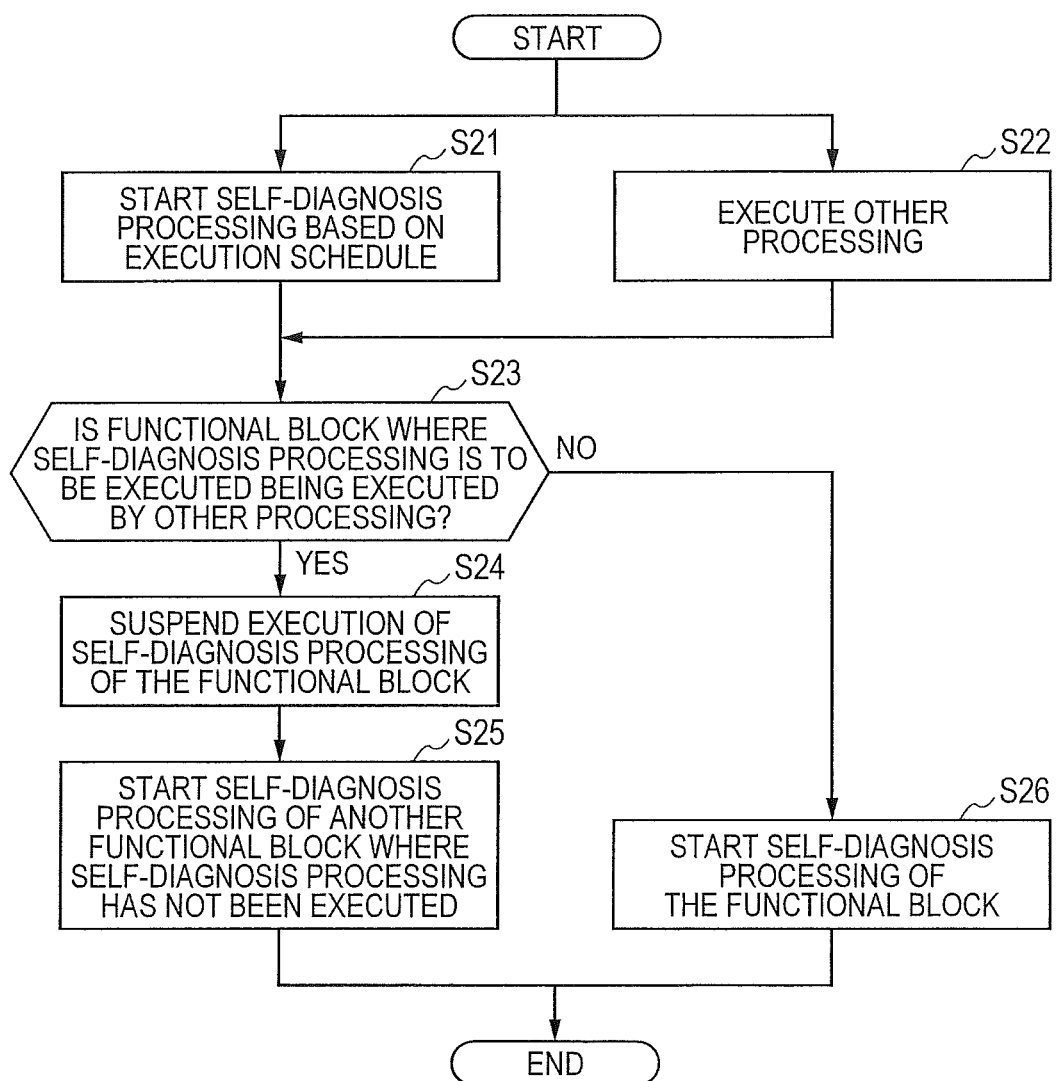
FIG. 7 is a flowchart showing a flow of self-diagnosis processing according to the third embodiment.

FIG. 7 is a flowchart showing a flow of the self-diagnosis processing according to the third embodiment. First, the self-diagnosis unit 150a starts the self-diagnosis processing based on the execution schedule 160 (S21). For example, the self-diagnosis unit 150a sequentially executes the self-diagnosis processing of a plurality of functional blocks defined in the execution schedule 160 according to a prescribed execution order.

In parallel with step S21, a semiconductor device in which the self-diagnosis device 100a is mounted starts execution of other processing that uses a plurality of functional blocks (S22).

Here, the self-diagnosis unit 150a determines whether or not a functional block where the self-diagnosis processing is to be executed based on the execution schedule 160 is being executed by the other processing of step S22 (S23). Here, when the self-diagnosis unit 150a determines that the functional block is being executed, the self-diagnosis unit 150a suspends the execution of the self-diagnosis processing of the functional block where the self-diagnosis processing is to be executed (S24). Further, the self-diagnosis unit 150a starts the self-diagnosis processing of another unexecuted functional block based on the execution schedule 160 (S25). On the other hand, in step S23, when the self-diagnosis unit 150a determines that the functional block where the self-diagnosis processing is to be executed is not being executed by the other processing, the self-diagnosis unit 150a starts the self-diagnosis processing of the functional block where the self-diagnosis processing is to be executed according to the execution schedule 160 (S26).

In this way, it is possible to improve the flexibility of the self-diagnosis processing by the third embodiment. Further, it is possible to advance the self-diagnosis processing in parallel with other processing, so that it is possible to prevent the self-diagnosis processing from stopping and surely complete the self-diagnosis processing of most functional blocks except for some functional blocks.

Fourth Embodiment

The fourth embodiment is a combination of the first to the third embodiments described above. Specifically, the self-diagnosis unit according to the fourth embodiment changes a functional block where the self-diagnosis processing is to be executed after the functional block where the self-diagnosis processing is being executed according to an execution status of other processing other than the self-diagnosis processing, in addition to at least the function of the first embodiment. Thereby, the flexibility of the self-diagnosis processing improves, so that it is possible to respond to various requests.

It is preferable that the fourth embodiment has the function of the third embodiment. Specifically, when the self-diagnosis unit according to the fourth embodiment starts the self-diagnosis processing of a functional block in a selected processing unit, if the functional block is being executed by other processing, the self-diagnosis unit starts the self-diagnosis processing of another unexecuted functional block instead of the functional block. Thereby, it is possible to prevent the self-diagnosis processing from stopping and surely complete the self-diagnosis processing of most functional blocks except for some functional blocks.

Further, in addition to the above, it is preferable that the fourth embodiment has the following configuration. Each of the plurality of functional blocks has execution state information that indicates the execution state of the functional block. Before the self-diagnosis unit starts the self-diagnosis processing of a functional block in a selected processing unit, the self-diagnosis unit refers to the execution state information of the functional block, and when the execution state information indicates that the functional block is being executed by other processing, the self-diagnosis unit starts the self-diagnosis processing of another unexecuted functional block instead of the functional block. Thereby, it is possible to efficiently execute the self-diagnosis processing because the functional blocks have their own latest execution state.

Further, in addition to the above, it is preferable that the fourth embodiment has the following configuration. Each of the plurality of functional blocks has permission information that indicates permission or non-permission of the self-diagnosis processing. Before the self-diagnosis unit starts the self-diagnosis processing of a functional block in a selected processing unit, the self-diagnosis unit refers to the permission information of the functional block, and when the permission information indicates that the self-diagnosis processing of the functional block is not permitted, the self-diagnosis unit starts the self-diagnosis processing of another unexecuted functional block instead of the functional block. Thereby, when the self-diagnosis processing of a specific functional block is avoided at some time, it is possible to directly control from the outside without changing the execution schedule itself. Therefore, it is possible to quickly reflect the suspension of the self-diagnosis of the functional block while the self-diagnosis is being executed.

Further, in addition to the above, it is preferable that the fourth embodiment has the following configuration. When the self-diagnosis unit changes a functional block where the self-diagnosis processing is to be executed after the functional block where the self-diagnosis processing is being executed, the self-diagnosis unit notifies that the functional block where the self-diagnosis processing is to be executed is changed as a self-diagnosis result. Thereby, the user can clearly recognize the functional block where the self-diagnosis processing is suspended. For example, if the suspension continues for a long time, it is known that something is abnormal or the execution schedule needs to be reviewed.

Figure 8:
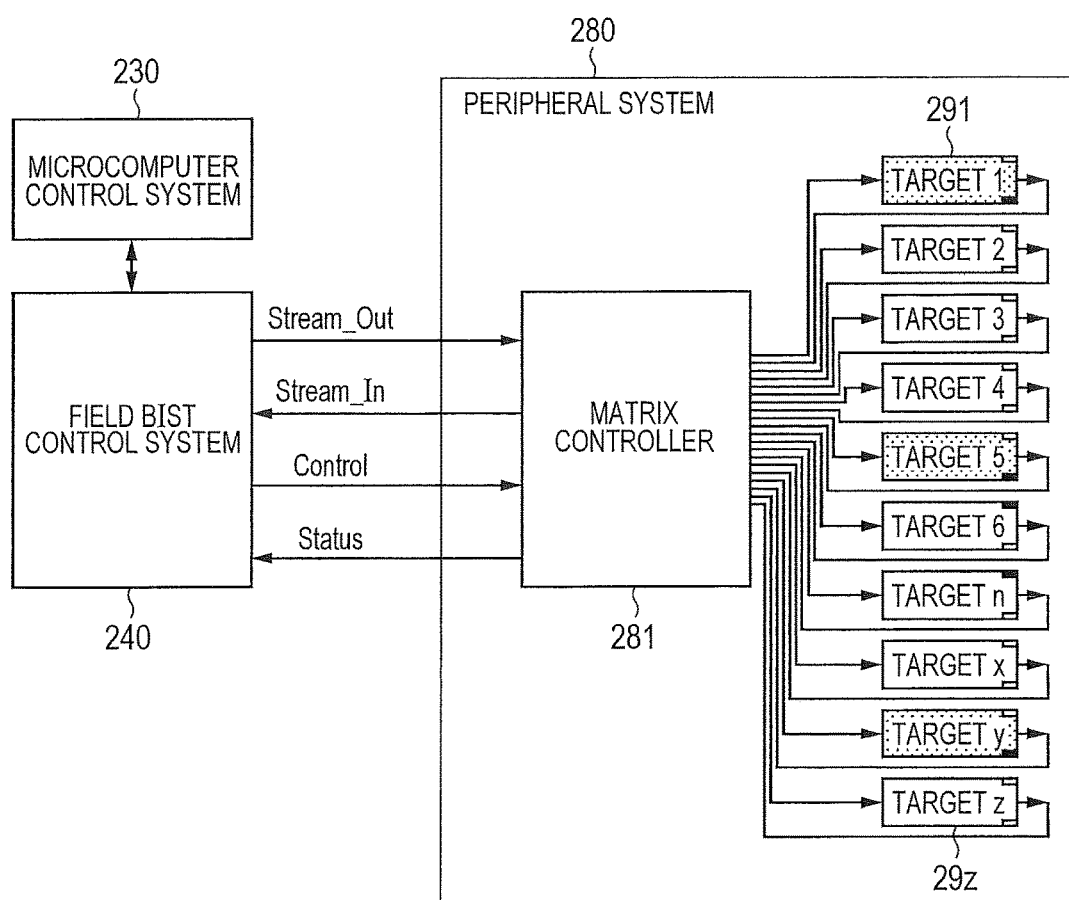
FIG. 8 is a block diagram showing a configuration of a peripheral system according to a fourth embodiment.

FIG. 8 is a block diagram showing a configuration of a peripheral system 280 according to a fourth embodiment. The other configuration is the same as that of FIG. 3 and the like according to the second embodiment. The peripheral system 280 includes a matrix controller 281 and target units 291 to 29z. Each of the target unit 291 and the like is coupled to a control signal IN1 or the like from the matrix controller 281. Each of the target unit 291 and the like is coupled to an output signal OUT1 or the like to the matrix controller 281, a mask value FLG11 or the like, and a flag value FLG12 or the like.

Figure 9:
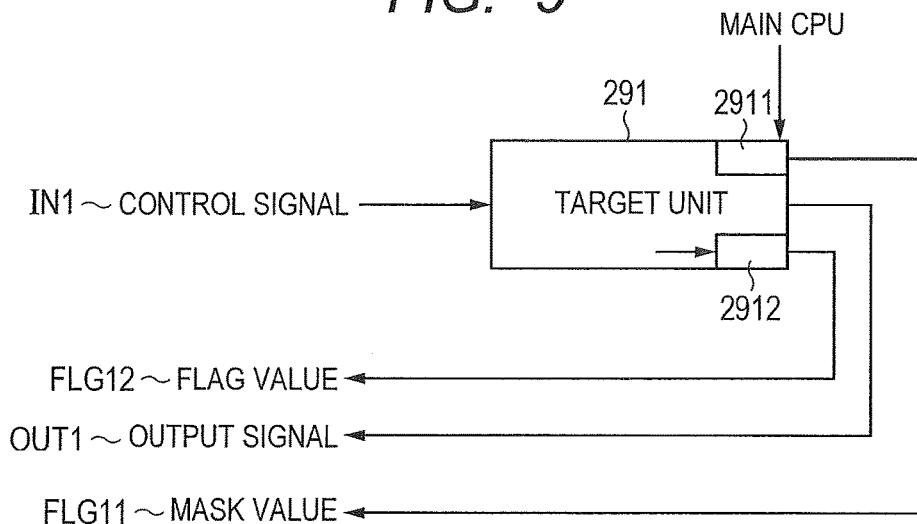
FIG. 9 is a block diagram showing a configuration of a target unit according to the fourth embodiment.

FIG. 9 is a block diagram showing a configuration of the target unit 291 according to the fourth embodiment. The configurations of the target units 292 to 29z are the same as that of the target unit 291, so that the drawing and the description thereof will be omitted. The target unit 291 has a mask 2911 and a flag 2912 in a register.

The mask 2911 is an example of the permission information described above and is information indicating whether or not to permit the execution of self-diagnosis processing in the target unit 291. For example, "0" (permission) or "1" (not-permission) is set to the mask 2911 from the main CPU 270 through the internal bus 250 according to the execution of the user program and the like. In this case, "0" of the mask 2911 indicates that the execution of the self-diagnosis processing is a permission state (=non-masked state) and "1" of the mask 2911 indicates that the execution of the self-diagnosis processing is a non-permission state (=masked state).

The flag 2912 is an example of the execution state information described above and is information indicating that the target unit 291 is used by other processing (for example, the user program). Regarding the flag 2912, when the target unit 291 is started to be used (executed) by processing other than the self-diagnosis processing, "1" is set to the register by the target unit 291 itself. In this case, the flag 291 indicates a state in which the target unit 291 is used by the user program (=self-diagnosis non-executable state). When the use is completed, "0" is set to the register by the target unit 291 itself. In this case, the flag 291 indicates a state in which the target unit 291 is not used by the user program (=self-diagnosis executable state).

Let us return to FIG. 8. The matrix controller 281 realizes one chain by pseudo-coupling the output signal of the nth target unit as the control signal of the (n+1) th target unit according to the execution order of the self-diagnosis processing shown in the chain. The output signal of the last target unit in the execution order of the self-diagnosis processing is outputted to the Field-BIST control system 240 as a test result of the chain.

When the mask 2911 or the flag 2912 of a certain target unit is "1" before the start of the self-diagnosis processing of the target unit, the matrix controller 281 releases the pseudo-coupling to the target unit, pseudo-couples to the next target unit in the execution order, and continues the self-diagnosis processing. In other words, even when the self-diagnosis processing is being executed, it is possible to temporarily remove a subsequent target unit from the self-diagnosis processing targets by changing the execution schedule. Therefore, even after the self-diagnosis processing of a certain chain is started, a certain target unit does not disturb the execution of the user program. At this time, the matrix controller 281 may implement the above operation by exchanging the execution order of the target unit with the execution order of another unexecuted target unit, changing the execution order of the target unit to the last of the chain, or remove the target unit from the self-diagnosis processing of the current chain.

Figure 10:
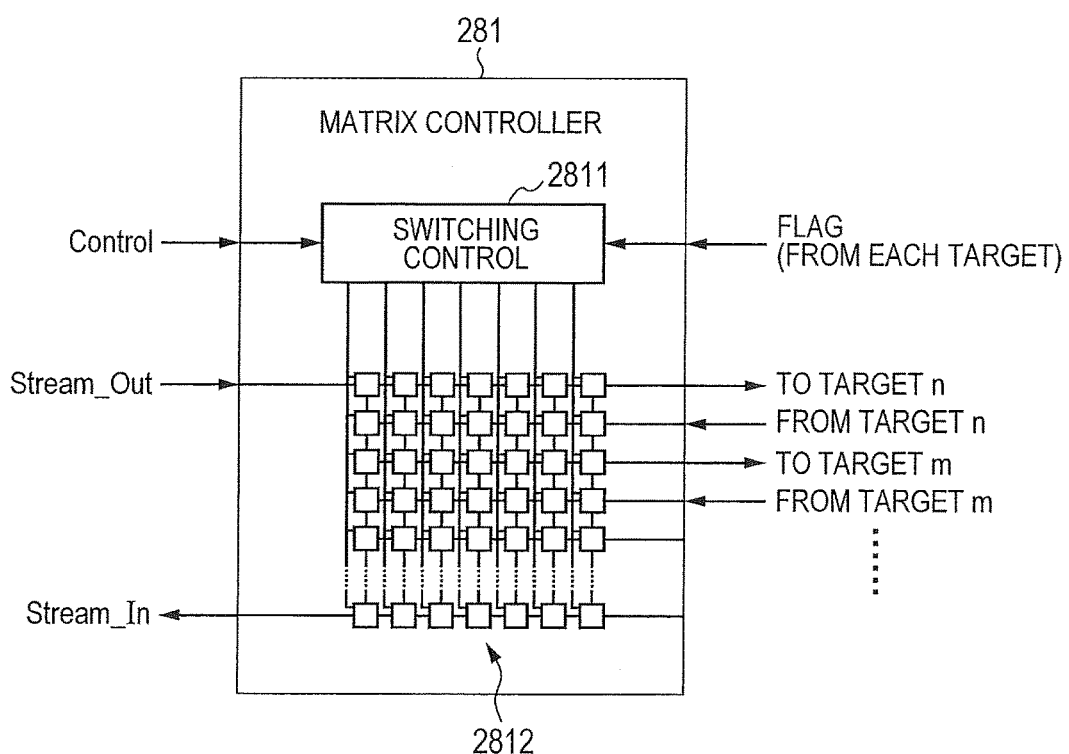
FIG. 10 is a block diagram showing a configuration of a matrix controller according to the fourth embodiment.

Here, FIG. 10 is a block diagram showing a configuration of the matrix controller 281 according to the fourth embodiment. The matrix controller 281 includes a switching control 2811 and a switch circuit group 2812.

Here, every time the matrix controller 281 is instructed to start execution of the self-diagnosis processing from the Field-BIST control system 240, information (the execution order of target units and the like) of a chain specified as the highest priority chain is outputted (by a control signal Control) from the scheduler 241 through the controller 242. Thereby, the switching control 2811 pseudo-couples target units whose execution orders are adjacent to each other in the switch circuit group 2812 as described above.

The matrix controller 281 is interconnected with the controller 242 by Stream_Out and Stream_In for inputting/outputting a test pattern, a control signal Control, and a signal Status (not shown in the drawings) that indicates an execution state and an execution result from the peripheral system 280. Handshake of the Control signal for operation control and the Status signal indicating an operating state is performed between the controller 242 and the matrix controller 281.

After completing the pseudo-coupling, the matrix controller 281 receives the test pattern for the target unit generated by the BIST circuit 2421 of the controller 242 as Stream_Out information. Then, the matrix controller 281 outputs the test pattern to the target unit that is pseudo-coupled as the first in the execution order in the switch circuit group 2812. Thereafter, the matrix controller 281 outputs an output result from the first target unit to the second target unit. Thereafter, the same operation is performed until the last target unit in the execution order is processed.

Then, the matrix controller 281 outputs a test result shifted out from the last target unit to the BIST circuit 2421 of the controller 242 as Stream_In. Thereby, the BIST circuit 2421 compares the output result with an expected value (not shown in the drawings), performs pass-fail judgment (Pass/Fail), and stores a result of the judgment in the execution result 2422 (register).

In a case in which an appropriate operation cannot be completed in an expected time or cannot be continued due to some cause including a circuit failure, the case is detected by the built-in timer 2413 in the scheduler 241 as Time Out and the detection result is written to the execution result 2422 register in the controller 242. Then, a user can check the execution status (whether executing or not) and the execution result (normal end/abnormal end) of the self-diagnosis by reading a register value of the execution result 2422.

Figure 11:
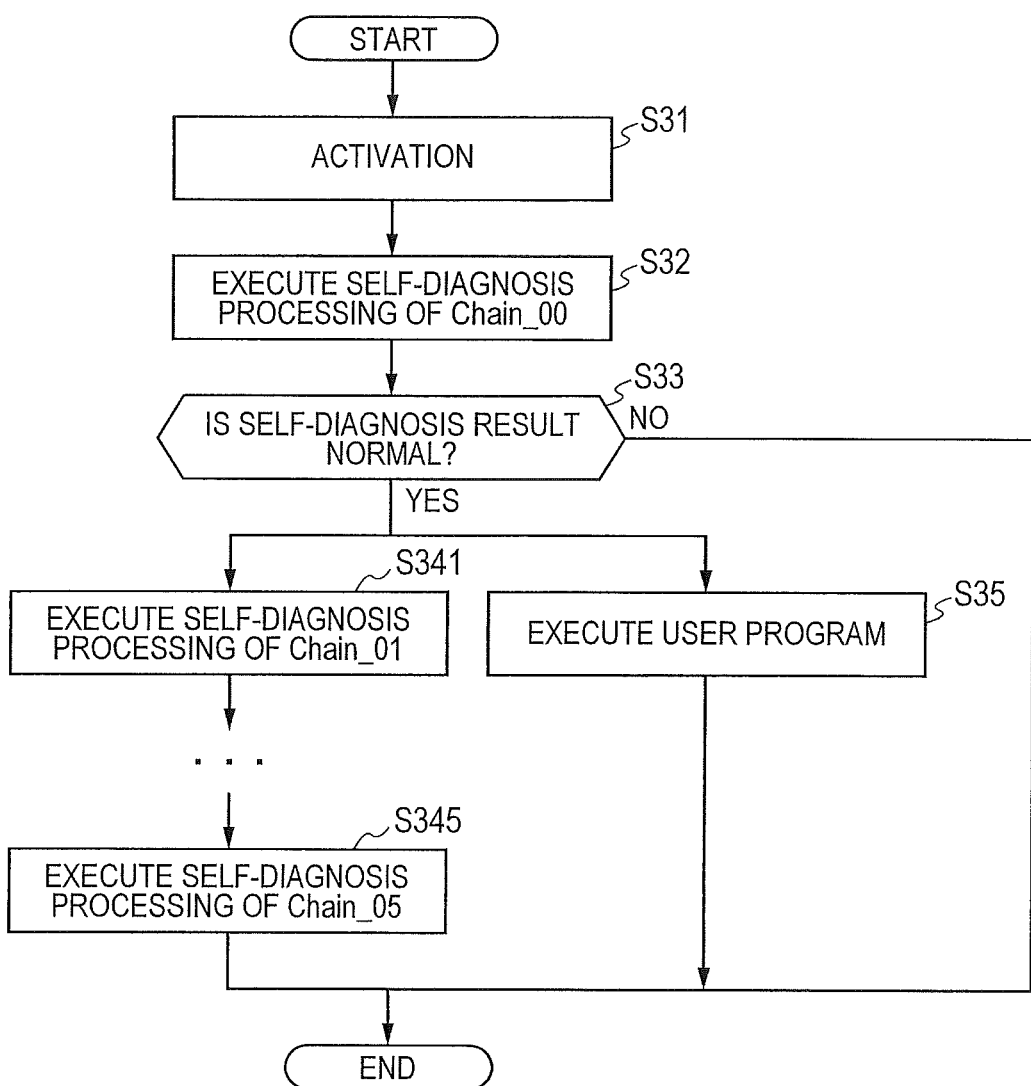
FIG. 11 is a flowchart showing a flow of execution of a microcomputer according to the fourth embodiment.

FIG. 11 is a flowchart showing a flow of execution of a microcomputer according to the fourth embodiment. First, the microcomputer is activated (S31). Thereby, the scheduler 241 reads the Field BIST control information 211 from the non-volatile memory 210 and internally stores the Field BIST control information 211. Here, the scheduler 241 selects "Chein_00" as the target of the self-diagnosis processing because it is immediately after power-on.

Subsequently, the controller 242 executes the self-diagnosis processing of "Chein_00" (S32). Specifically, first, the controller 242 receives an execution instruction of the self-diagnosis processing of "Chein_00" from the microcomputer control system 230. Then, information of "Chein_00" is outputted from the execution plan 2411 and the execution target 2412 of the scheduler 241 to the controller 242. Thereafter, the controller 242 issues an execution instruction of the self-diagnosis processing of "Chein_00" to the matrix controller 281, generates a test pattern of the self-diagnosis processing, and outputs the test pattern to the matrix controller 281. Thereby, the self-diagnosis processing is executed in a corresponding target unit in the peripheral system 280 and a self-diagnosis result is outputted to the controller 242.

Subsequently, the controller 242 determines whether or not the self-diagnosis result is normal (S33). When the self-diagnosis result is determined to be abnormal, the controller 242 outputs a message accordingly to the outside and ends the processing. On the other hand, when the self-diagnosis result is determined to be normal, the main CPU 270 starts execution of the user program (S35) and the scheduler 241 and the controller 242 execute the self-diagnosis processing of "Chein_01" (S341). The flow of the self-diagnosis processing of "Chein_01" is the same as that of "Chein_00". The determination corresponding to step S33 is also performed. However, the determination is omitted in the flowchart. Subsequently, the self-diagnosis processing of "Chein_02", . . . , "Chein_05" is performed (S345).

Figure 12:
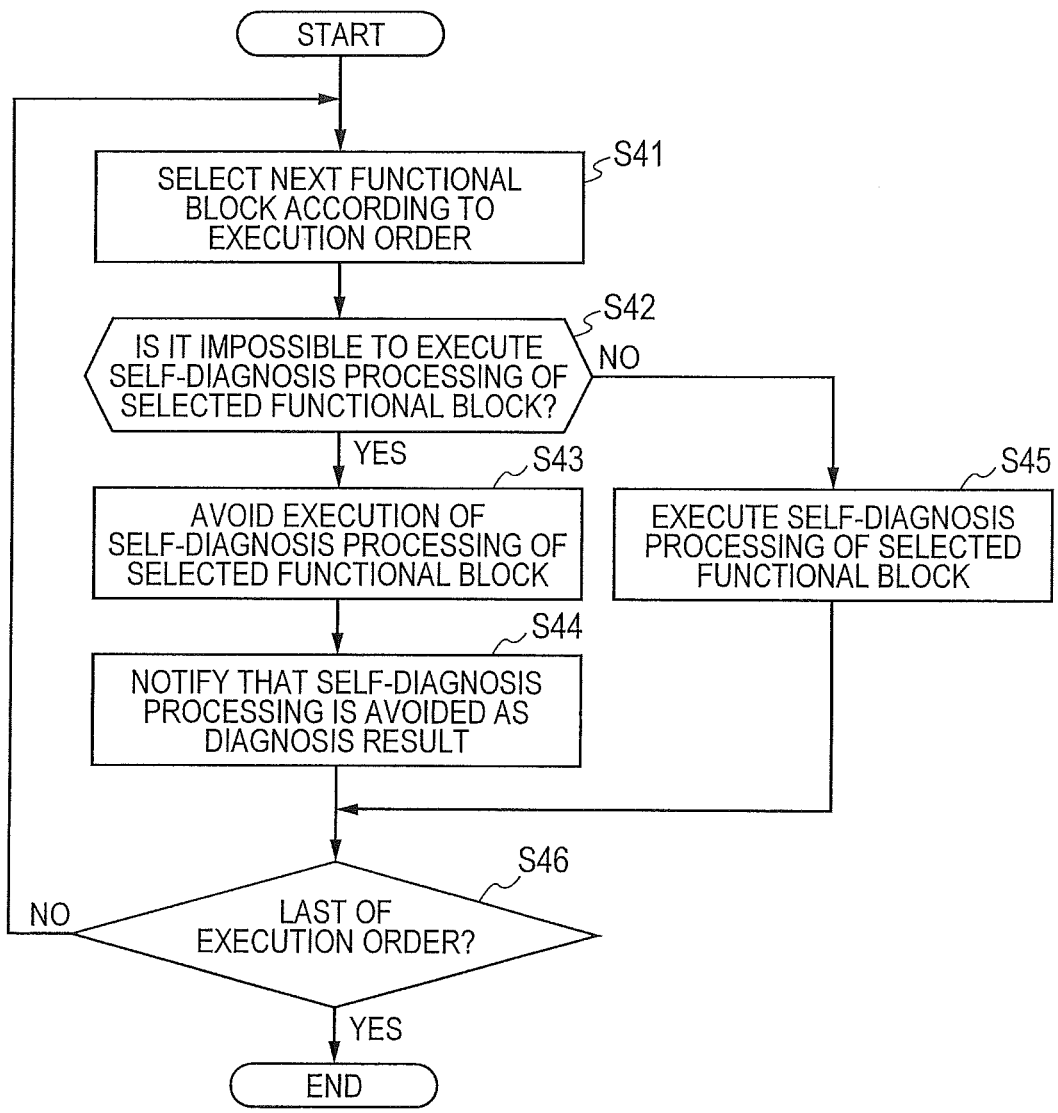
FIG. 12 is a flowchart showing a flow of self-diagnosis processing according to the fourth embodiment.

FIG. 12 is a flowchart showing a flow of the self-diagnosis processing according to the fourth embodiment. Here, processing common to each self-diagnosis processing in step S341 to 345 in FIG. 11 will be described. The processing can also be applied to the self-diagnosis processing in step S32.

First, the matrix controller 281 selects a functional block (target unit) where the self-diagnosis processing is to be executed next according to the execution order in the target chain (S41). Then, the matrix controller 281 determines whether or not the self-diagnosis processing of the selected functional block cannot be executed (S42). Specifically, the matrix controller 281 refers to the mask 2911 and the flag 2912 of the selected functional block. When either one of them is "1", the matrix controller 281 avoids the execution of the self-diagnosis processing of the selected functional block (S43). Specifically, the switching control 2811 changes the pseudo-coupling of the switch circuit group 2812 to the next functional block in the execution order. Then, the matrix controller 281 notifies the controller 242 that the self-diagnosis processing of the functional block is avoided as a diagnosis result (S44).

On the other hand, when both the mask 2911 and the flag 2912 are "0", the matrix controller 281 executes the self-diagnosis processing of the selected functional block (S45). After step S44 and S45, the matrix controller 281 determines whether or not the functional block of the processing target is the last of the execution order (S46). When the functional block is not the last of the execution order, the matrix controller 281 returns to step S41 and continues the process. On the other hand, when the functional block is the last of the execution order, the matrix controller 281 ends the process.

From the above, the summary of the effects of the fourth embodiment is as follows. In the self-diagnosis while the system is being operated after the start of the execution of the user program, it is possible to know the operating state of the self-diagnosis target unit, so that if the self-diagnosis target unit does not operate, the self-diagnosis processing can be executed in the background of the user program. As a result, although in Japanese Unexamined Patent Application Publication No. 2012-252373 and the like, the normal operation mode and the self-diagnosis mode can be executed only in series, it is possible to reduce the entire self-diagnosis processing time by executing the normal operation mode and the self-diagnosis mode in parallel. Further, it is possible to change the interval of the self-diagnosis processing according to the operating status of the user system, so that the self-diagnosis of a diagnosis target portion important for functional safety can be executed in shorter intervals and the self-diagnosis of a diagnosis target portion that is not so important for functional safety can be executed in longer intervals. Therefore, it is possible to implement a more safe appropriate system operation.

Further, conventionally, when the self-diagnosis target unit is operating, the self-diagnosis processing is kept waiting until the target unit becomes a non-operating state or the self-diagnosis processing may not be executed practically depending on the operating state. Therefore, by a changing mechanism of the self-diagnosis target unit and a checking mechanism of the operating state of the self-diagnosis target unit of the embodiment, the operating state of the self-diagnosis target unit can be known in the self-diagnosis while the system is being operated after the start of the execution of the user program. Therefore, it is possible to dynamically change the execution schedule, so that the aforementioned problems can be solved. Thus, it is possible to safely operate the user system.

Fifth Embodiment

The fifth embodiment is an improved example of the embodiments described above. Specifically, when interrupt processing occurs before the self-diagnosis unit according to the fifth embodiment starts the self-diagnosis processing of a functional block in a selected processing unit, the self-diagnosis unit starts the self-diagnosis processing in another processing unit instead of the functional block. Thereby, when an interrupt request caused by a failure occurs for a functional block whose operation frequency is normally low but which is used for emergency such as a failure occurrence, it is possible to determine whether or not the functional block used for emergency is safe and perform an appropriate failure analysis by executing the self-diagnosis processing by using a chain used when a failure occurs.

Sixth Embodiment

The sixth embodiment is an improved example of the embodiments described above. Specifically, when the self-diagnosis unit according to the sixth embodiment starts the self-diagnosis processing of a functional block in a selected processing unit, if the load of the entire self-diagnosis device by other processing is lower than a predetermined value, the self-diagnosis unit starts the self-diagnosis processing of another unexecuted functional block along with the self-diagnosis processing of the functional block. Thereby, when the self-diagnosis unit executes the self-diagnosis processing in parallel with the user program, if there is still a free resource, the self-diagnosis unit can collectively execute the self-diagnosis processing of the remaining target units in the chain. Therefore, it is possible to efficiently reduce the self-diagnosis time with low risk.

Seventh Embodiment

When the self-diagnosis processing is executed in parallel as described above, there is a risk that the peak of current consumption increases. If the peak current increases, the temperature of the microcomputer also rises and it may negatively affect the entire system in which the microcomputer is mounted. Therefore, in the seventh embodiment, the clocks at the start time are differentiated between a plurality of functional blocks that are defined to be executed in parallel.

Specifically, when there are two or more processing units whose start conditions are the same, the self-diagnosis unit according to the seventh embodiment adjusts the start timing of the self-diagnosis processing of the functional blocks between the processing units. For example, when the start clocks of functional blocks are differentiated, it is possible to smooth the peak current. Therefore, in addition to the effects of the first embodiment described above, it is possible to suppress current increase per unit time.

Other Embodiments

For clarification of the description, the description below and the drawings are appropriately omitted and simplified. Each element depicted in the drawings as a functional block that performs various processing can be configured by a CPU, a memory, and other circuits in a hardware manner, and is realized by a program and the like loaded on a memory in a software manner. Therefore, a person skilled in the art understands that these functional blocks can be realized by various forms, such as by only hardware, by only software, or by a combination of these, and the forms are not limited to any one of these. In the drawings, the same elements are denoted by the same reference numerals and redundant description is omitted as needed.

The aforementioned program can be stored by using various types of non-transitory computer readable media and supplied to a computer. The non-transitory computer readable media include various types of tangible storage media. Examples of the non-transitory computer readable media include a magnetic recording medium (for example, a flexible disk, a magnetic tape, and a hard disk drive), a magneto-optical medium (for example, a magnet-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, and a RAM (Random Access Memory)). Further, the program may be supplied to a computer by various types of transitory computer readable media. Examples of the transitory computer readable media include an electrical signal, an optical signal, and an electromagnetic wave. The transitory computer readable media can supply the program to a computer through a wired communication path such as an electric cable and an optical fiber or a wireless communication path.

While the invention made by the inventors has been specifically described based on the embodiments, the invention is not limited to the embodiments, but needless to say that the invention may be modified in various ways without departing from the scope of the invention.

What is claimed is:

1. A self-diagnosis device, comprising:
    a plurality of functional blocks;
    a storage unit that stores a plurality of processing units, each of which includes an aggregate of some functional blocks selected from the functional blocks, and a start condition of self-diagnosis processing of each processing unit; and
    a self-diagnosis unit that selects the processing unit where the self-diagnosis processing is started based on the start condition of each processing unit and executes the self-diagnosis processing of each functional block in the selected processing unit,
    wherein a first functional block of the functional blocks in which the execution of the self-diagnosis processing takes a first time duration is included in a first processing unit of the processing units to which a first number of functional blocks belongs, and a second functional block of the functional blocks in which the execution of self-diagnosis processing takes a second time duration, which is less than the first time duration, is included in a second processing unit of the processing units to which a second number of functional blocks belongs, the second number of functional blocks being larger than the first number of functional blocks wherein the self-diagnosis device is built in a microcomputer.

2. The self-diagnosis device according to claim 1, wherein the self-diagnosis unit changes scheduling of a functional block where the self-diagnosis processing and an other processing other than the self-diagnosis processing are to be executed according to an execution status of the other processing other than the self-diagnosis processing.

3. The self-diagnosis device according to claim 2, wherein, when the self-diagnosis unit starts the self-diagnosis processing of a functional block in the selected processing unit, if the functional block is being executed by the other processing, the self-diagnosis unit starts the self-diagnosis processing of another unexecuted functional block instead of the functional block.

4. The self-diagnosis device according to claim 3, wherein each of the functional blocks includes execution state information that indicates an execution state of the functional block,
    wherein the self-diagnosis unit refers to the execution state information of the functional block in the selected processing unit before starting the self-diagnosis processing of the functional block, and
    wherein, when the execution state information indicates that the functional block is being executed by the other processing, the self-diagnosis unit starts the self-diagnosis processing of another unexecuted functional block instead of the functional block.

5. The self-diagnosis device according to claim 3, wherein each of the functional blocks includes permission information that indicates permission or non-permission of the self-diagnosis processing,
    wherein the self-diagnosis unit refers to the permission information of the functional block in the selected processing unit before starting the self-diagnosis processing of the functional block, and
    wherein, when the permission information indicates that the self-diagnosis processing of the functional block is not permitted, the self-diagnosis unit starts the self-diagnosis processing of another unexecuted functional block instead of the functional block.

6. The self-diagnosis device according to claim 1, wherein the start condition includes an execution order of the self-diagnosis processing of the functional blocks in each processing unit and a priority between the processing units, and
    wherein the self-diagnosis unit selects the processing unit where the self-diagnosis processing is started based on the priority and executes the self-diagnosis processing of each functional block in the selected processing unit based on the execution order.

7. The self-diagnosis device according to claim 2, wherein, when the self-diagnosis unit changes the scheduling of a functional block where the self-diagnosis processing is to be executed, the self-diagnosis unit notifies that the functional block where the self-diagnosis processing is to be executed is changed as a self-diagnosis result.

8. The self-diagnosis device according to claim 2, wherein when an interrupt processing occurs before the self-diagnosis unit starts the self-diagnosis processing of a functional block in the selected processing unit, the self-diagnosis unit starts the self-diagnosis processing in another processing unit instead of the functional block.

9. The self-diagnosis device according to claim 2, wherein, when the self-diagnosis unit starts the self-diagnosis processing of a functional block in the selected processing unit, if a load of an entire self-diagnosis device by the other processing is lower than a predetermined value, the self-diagnosis unit starts the self-diagnosis processing of another unexecuted functional block along with the self-diagnosis processing of the functional block.

10. The self-diagnosis device according to claim 1, wherein, when there are two or more processing units whose start conditions are the same, the self-diagnosis unit adjusts a start timing of the self-diagnosis processing of the functional blocks between the processing units.

11. A self-diagnosis device, comprising:
a plurality of functional blocks;
a storage unit that stores an execution schedule of self-diagnosis processing of the functional blocks; and
a self-diagnosis unit that executes the self-diagnosis processing of the functional blocks based on the execution schedule,
wherein, while executing the self-diagnosis processing, the self-diagnosis unit changes scheduling of a functional block where the self-diagnosis processing is to be executed in the execution schedule according to an execution status of other processing other than the self-diagnosis processing, and
wherein a first functional block of the functional blocks in which the execution of the self-diagnosis processing takes a first time duration is included in a first processing unit of the processing units to which a first number of functional blocks belongs, and a second functional block of the functional blocks in which the execution of self-diagnosis processing takes a second time duration, which is less than the first time duration, is included in a second processing unit of the processing units to which a second number of functional blocks belongs, the second number of functional blocks being larger than the first number of functional blocks wherein the self-diagnosis device is built in a microcomputer.

12. The self-diagnosis device according to claim 11, wherein the self-diagnosis unit executes the self-diagnosis processing in parallel with the other processing, and
wherein, when a functional block where the self-diagnosis processing is to be executed based on the execution schedule is being executed by the other processing, the self-diagnosis unit starts the self-diagnosis processing of another unexecuted functional block instead of the functional block.

13. A self-diagnosis method using a semiconductor device that executes a self-diagnosis processing of functional blocks, the self-diagnosis method comprising:
setting processing units, each of which includes an aggregate of some functional blocks selected from the functional blocks, and a start condition of self-diagnosis processing of each processing unit;

selecting the processing unit where the self-diagnosis processing is started based on the start condition of each processing unit; and
executing the self-diagnosis processing of each functional block in the selected processing unit,
wherein a first functional block of the functional blocks in which the execution of the self-diagnosis processing takes a first time duration is included in a first processing unit of the processing units to which a first number of functional blocks belongs, and a second functional block of the functional blocks in which the execution of self-diagnosis processing takes a second time duration, which is less than the first time duration, is included in a second processing unit of the processing units to which a second number of functional blocks belongs, the second number of functional blocks being larger than the first number of functional blocks wherein the self-diagnosis device is built in a microcomputer.

14. The self-diagnosis device according to claim 1, wherein the self-diagnosis processing and an other processing, other than the self-diagnosis processing, are executed in parallel in the functional blocks.

15. The self-diagnosis device according to claim 14, wherein, while the self-diagnosis processing is being executed, the self-diagnosis unit changes scheduling of a functional block of the functional blocks where the self-diagnosis processing is to be executed according to an execution status of an other processing, other than the self-diagnosis processing.

16. The self-diagnosis device according to claim 1, wherein the self-diagnosis processing and an other processing, other than the self-diagnosis processing, are executed in a functional block of the functional blocks, and
wherein, when the functional block of the functional blocks is to be executed based on the other processing, the self-diagnosis unit starts the self-diagnosis processing of another unexecuted functional block instead of the functional block.

17. The self-diagnosis device according to claim 1, wherein, while the self-diagnosis processing is being executed, the self-diagnosis unit changes scheduling of a functional block of the functional blocks where the self-diagnosis processing is to be executed according to an execution status of an other processing, other than the self-diagnosis processing.

18. The self-diagnosis method according to claim 13, wherein the self-diagnosis processing and an other processing other than the self-diagnosis processing are executed in parallel in the functional blocks.

19. The self-diagnosis method according to claim 1, wherein the self-diagnosis processing and an other processing, other than the self-diagnosis processing, are executed in a functional block of the functional blocks, and
wherein, when the functional block of the functional blocks is to be executed based on the other processing, the self-diagnosis processing of another unexecuted functional block, instead of the functional block, is started.

20. The self-diagnosis method according to claim 1, wherein, while the self-diagnosis processing is being executed, a functional block of the functional blocks where the sells-diagnosis processing is to be executed is changed according to an execution status of other processing, other than the self-diagnosis processing.

* * * * *